United States Patent
Minami et al.

(10) Patent No.: US 7,168,134 B2
(45) Date of Patent: Jan. 30, 2007

(54) OPENING AND CLOSING DEVICE

(75) Inventors: Katsuichi Minami, Fukui (JP); Koji Sakai, Fukui (JP); Toshio Ohie, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/251,436

(22) Filed: Oct. 14, 2005

(65) Prior Publication Data

US 2006/0101618 A1    May 18, 2006

(30) Foreign Application Priority Data

Nov. 12, 2004    (JP)    ............... 2004-328746

(51) Int. Cl.
  *E05F 1/08*    (2006.01)
(52) U.S. Cl. .......................................... 16/303; 16/330
(58) Field of Classification Search ................ 16/303, 16/330, 222, 268; 455/575.1, 575.3; 379/433.13, 379/434; 361/683, 803
  See application file for complete search history.

(56) References Cited

U.S. PATENT DOCUMENTS

| | | | | |
|---|---|---|---|---|
| 1,200,538 A | * | 10/1916 | Smith et al. ............... | 16/303 |
| 6,085,387 A | * | 7/2000 | Han ........................... | 16/330 |
| 6,808,402 B2 | * | 10/2004 | Ryu et al. ................... | 439/165 |
| 6,886,221 B2 | * | 5/2005 | Minami et al. .............. | 16/324 |
| 2004/0261224 A1 | * | 12/2004 | Li et al. ...................... | 16/330 |
| 2005/0066474 A1 | * | 3/2005 | Hsu et al. .................... | 16/330 |
| 2005/0091795 A1 | * | 5/2005 | Jeong et al. ................. | 16/303 |
| 2005/0108853 A1 | * | 5/2005 | Lee ............................. | 16/330 |

FOREIGN PATENT DOCUMENTS

JP    2004-245342    9/2004

* cited by examiner

*Primary Examiner*—Chuck Y. Mah
*Assistant Examiner*—Mark T. Vogelbacker
(74) *Attorney, Agent, or Firm*—RatnerPrestia

(57) ABSTRACT

An opening and closing device includes a fixed member, a movable member, a spring and a case. The fixed member is provided at a side with a fixed cam. The movable member is disposed so that it can rotate with respect to the fixed member, and provided at the side opposing to the fixed cam with a movable cam. The spring is for keeping the movable cam and the fixed cam in a state of elastic contact. The case has a substantially round cylindrical shape, and houses these items. There is a guiding mechanism formed between the case and the movable member for supporting the movable member so that it can move in the axis direction, which guiding mechanism is provided with a section of broader width at the end part facing to the fixed member.

16 Claims, 6 Drawing Sheets

OPENING AND CLOSING DEVICE

TECHNICAL FIELD

The present invention relates to an opening and closing device used in a portable telephone unit, a personal computer or other kinds of electronic apparatus for opening and closing its body.

BACKGROUND ART

Portable telephone units, personal computers and the like electronic devices are getting smaller in size and lighter in weight. Among them, an increasing number of recent models have been designed into a so-called foldable body structure, where a body is formed of a fixed cabinet and a movable cabinet which are coupled together like a clam shell. It is requested that the body can be opened and closed comfortably with high reliability.

A conventional opening and closing device used for the above purpose is described with reference to FIG. 5 through 7. Among the drawings, cross sectional views are illustrated magnified in the radius direction in order to show the inter-relationship of fixed cam and movable cam clearly.

Figure 5:
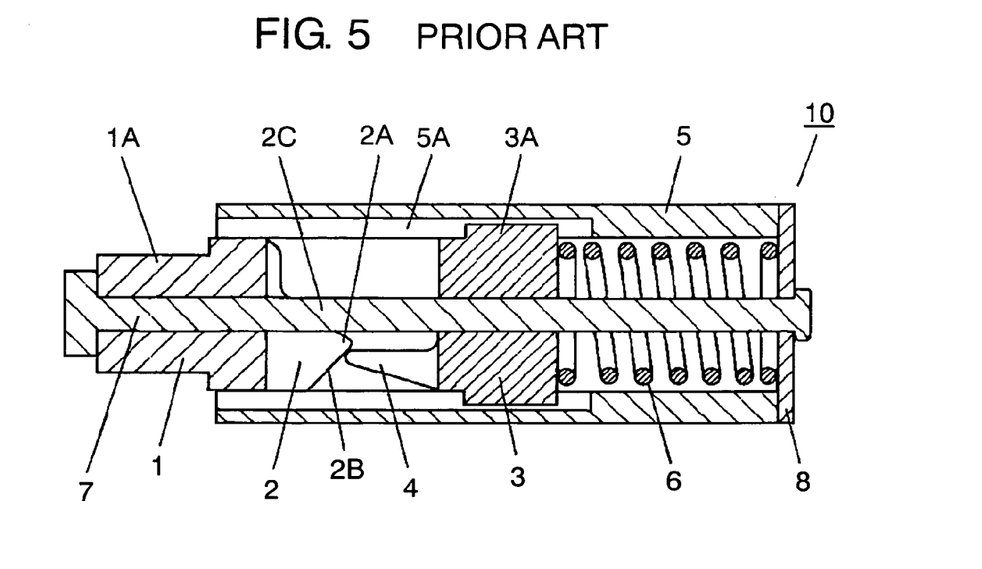
FIG. 5 is a cross sectional view of a conventional opening and closing device.
Figure 6:
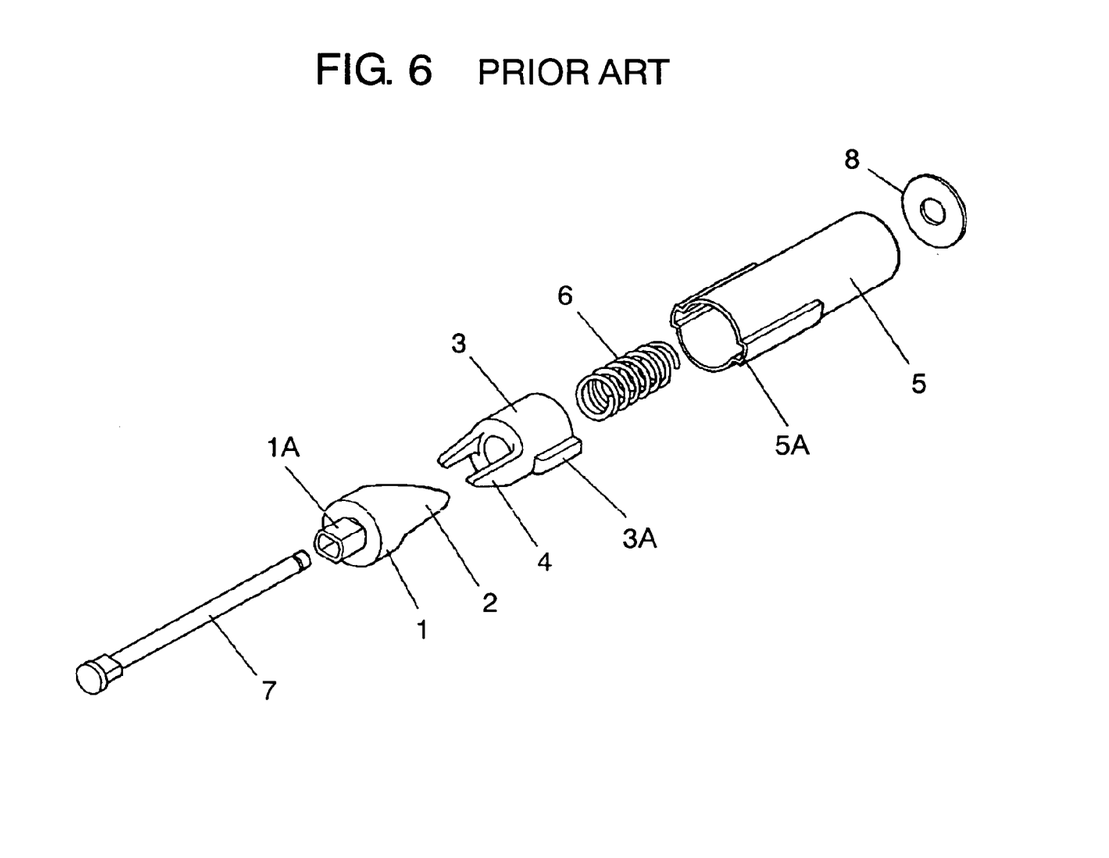
FIG. 6 is an exploded perspective view of a conventional opening and closing device.

FIG. 5 is a cross sectional view showing a conventional opening and closing device, FIG. 6 shows the exploded perspective view. Referring to FIG. 5 and FIG. 6; opening and closing device 10 includes fixed member 1, fixed cam 2, movable member 3, movable cam 4, case 5, spring 6, fixed shaft 7 and end ring 8. Fixed member 1 is made with a metal material; it has a substantially round cylindrical shape and provided at the left side with fixing portion 1A. Fixed cam 2 is provided at the right of fixed member 1 along the outer circumference; it is formed of protruding portion 2A and two slopes 2B and 2C stretching in the right and the left directions from protruding portion 2A.

Movable member 3 is made with a metal material; it has a substantially round cylindrical shape like fixed member 1. Movable cam 4 is provided at the left of movable member 3, or at the side opposing to fixed cam 2, along the outer circumference. Movable cam 4 is disposed so that it can rotate with respect to fixed member 1 in the direction of open and close. Case 5 is made with a sintered alloy metal, shaped into a substantially round cylindrical form. Case 5 is provided with guide groove 5A which is protruding outward. Guide groove 5A allows insertion of guide protrusion 3A, which is protruding from the outer circumferential surface of movable member 3, for supporting movable member 3 so that it can move along the direction of axis within case 5. In this way, a guiding mechanism is provided.

Spring 6, which has a coiled shape, is mounted in a slightly compressed state in case 5 between the right side of movable member 3 and case 5's right end-bottom. Spring 6 pushes movable member 3 to the left so that the tip end of movable cam 4 makes an elastic contact with fixed cam 2 at slope 2B. Fixed shaft 7 has a substantially round column shape. The left end of fixed shaft 7 is connected tight with fixed member 1, while the right end goes through movable member 3's central void and spring 6 to be supported by means of end ring 8 so as it can rotate with respect to the right end of case 5. Fixed member 1's fixing portion 1A is pushing out of the left side of case 5, and allowed to rotate. Case 5 houses fixed member 1, movable member 3, spring 6 and other items.

Figure 4A:
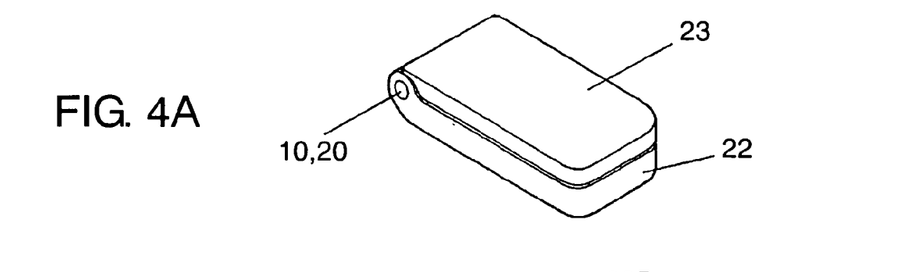
FIG. 4A through 4D are perspective views of a portable telephone unit incorporating an opening and closing device.
Figure 4B:
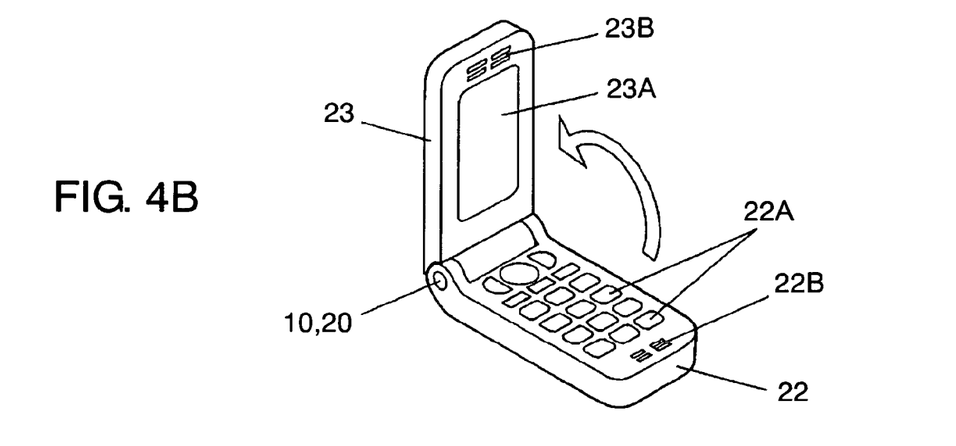

FIG. 4A through 4D are perspective views of a portable telephone unit, which incorporates an opening and closing device. The above-configured opening and closing device 10 is mounted in a portable telephone unit to couple fixed cabinet 22 and movable cabinet 23 together as shown in FIG. 4B, a perspective view. Describing more practically; fixing portion 1A of fixed member 1 is connected tight with fixed cabinet 22 which houses operating portion 22A consisting of a plurality of keys disposed on the surface area and sound input portion 22B consisting of a microphone, etc., while the outer circumferential surface of case 5's guide groove 5A is connected tight with movable cabinet 23 which includes display portion 23A such as a liquid crystal display (LCD) disposed on the surface area and sound output portion 23B consisting of a speaker, etc. Thus, fixed cabinet 22 and movable cabinet 23 are pivotally supported to be foldable by means of opening and closing device 10 to constitute the body of a portable telephone unit, or an electronic apparatus.

Figure 7A:
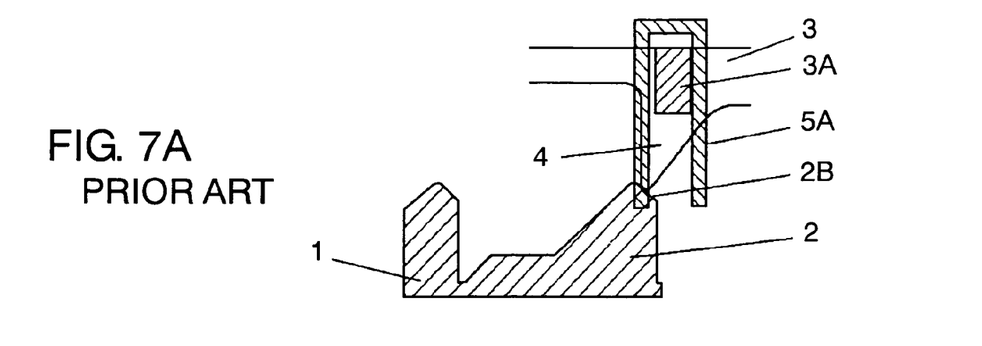
FIG. 7A through 7D are cross sectional views in part of a conventional opening and closing device.

FIG. 7A through 7D are cross sectional views in part of a conventional opening and closing device. In a state where the tip end of movable cam 4 of conventional opening and closing device 10 is making an elastic contact with fixed cam 2 at lower slope 2B, as illustrated in FIG. 5, movable member 3 is pressed downward, or towards the direction of closing, by the force of spring 6. Under this state, since the right end of guide protrusion 3A is having an elastic contact with guide groove 5A at the right as illustrated in FIG. 7A, movable cabinet 23 connected tight with case 5 is held at the closed stance with respect to fixed cabinet 22, as shown in FIG. 4A.

Figure 7B:
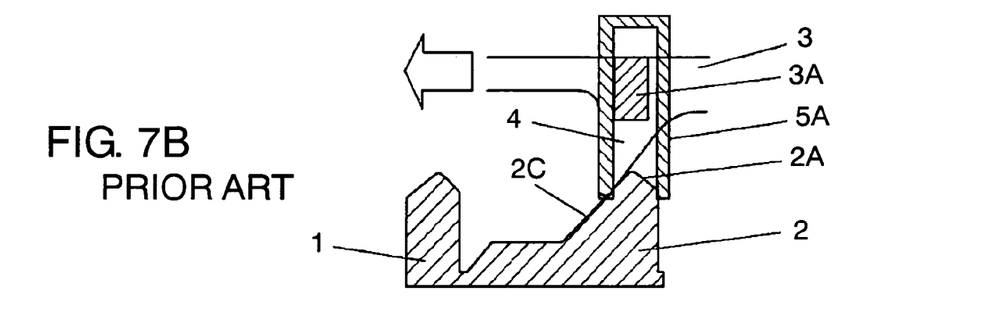

When movable cabinet 23 is opened by the hand as shown in FIG. 4B, the motion is conveyed via case 5 which is connected tight with movable cabinet 23, causing movable member 3 to rotate and move along the axis direction within case 5. The tip end of movable cam 4 travels beyond fixed cam 2's protruding portion 2A, as shown in FIG. 7B, to make an elastic contact with left slope 2C. Then, movable member 3 is provided with a force towards the left, or an opening force, and the left end of lowered guide protrusion 3A makes an elastic contact with guide groove 5A at the left. As the result, movable cabinet 23 is provided with an opening force.

Figure 4C:
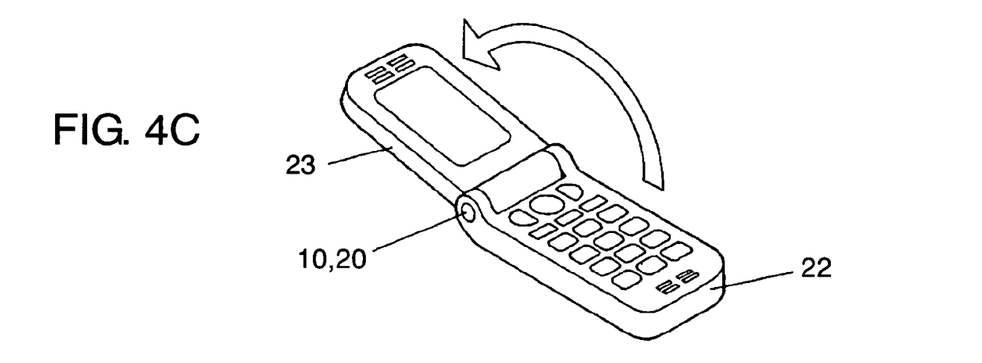
Figure 7C:
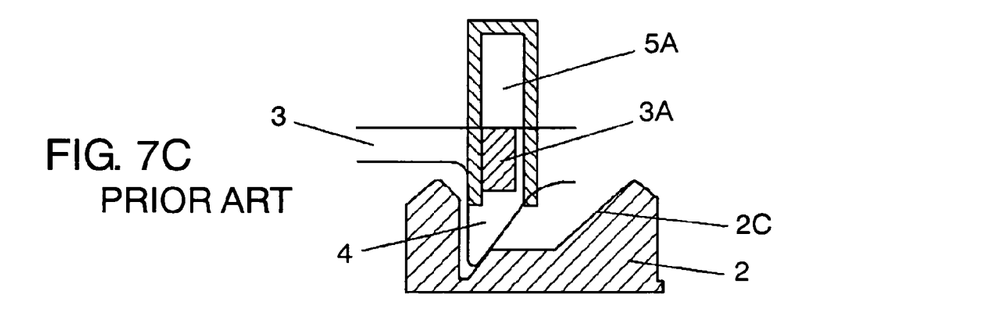

The tip end of movable cam 4 further slides along slope 2C keeping an elastic contact, and the left end of lowered guide protrusion 3A pushes guide groove 5A at the left, as illustrated in FIG. 7C, and then case 5 rotates towards the opening direction. When the tip end of movable cam 4 arrives at a certain specified location, movable cabinet 23 is brought to a certain predetermined open angle of about 150–170 degrees with respect to fixed cabinet 22, as shown in FIG. 4C.

As described in the above, opening and closing device 10 works in such a way that the rotating motion of case 5, which is connected tight with movable cabinet 23, causes movable member 3 to move in the axis direction, and the tip end of movable cam 4 is made to have an elastic contact with either one of slopes 2B and 2C of fixed cam 2. Under the operation of the above-described mechanism, movable cabinet 23 opens and closes relative to fixed cabinet 22.

Figure 4D:
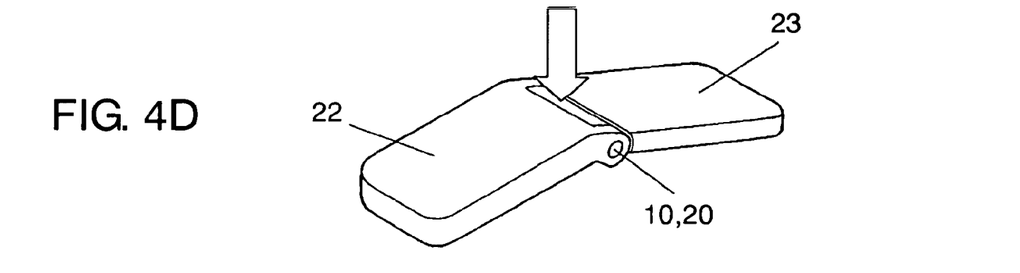
Figure 7D:
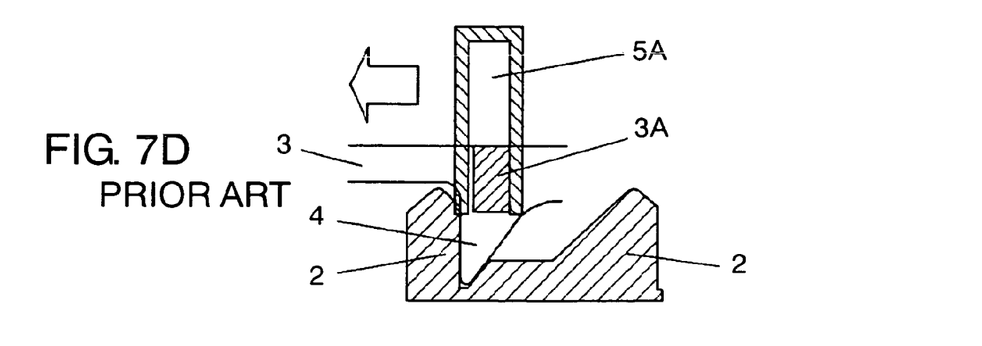

If movable cabinet 23, which has already been opened to a certain predetermined angle, is hit by an external power and forced to open further beyond the angle, for example if it is pushed by mistake from the behind as illustrated in FIG. 4D, conventional opening and closing device 10 allows case 5 to make an additional revolution for a small amount identical to the small gap existing between guide groove 5A and guide protrusion 3A as shown in FIG. 7D. However, it is not allowed to make any further opening action after the right face of guide protrusion 3A got in touch with guide groove 5A at the right and movable cam 4 touched the next fixed cam 2. The structure of such a conventional opening and closing device has been disclosed in, for example, Japanese Patent Unexamined Publication No. 2004-245342.

In the above-described conventional opening and closing device, an issue how to prevent a possible damage that could be incurred on fixed cam 2 and/or movable cam 4 when an external power is incidentally given to an already-opened body forcing it to open further is remaining as an outstanding problem to be solved. If a countermeasure is to be built in a hinge, the cam size had to be made larger, a separate stopper mechanism had to be prepared for fixed cabinet 22 and movable cabinet 23, or the like extra means had to be contrived. In any way, a hinge after countermeasure inevitably grew bigger in the overall size and/or more complicated in the total mechanism.

DISCLOSURE OF THE INVENTION

The present invention addresses the above-described problem of damage on constituent components that could be caused when an additional force is given by mistake onto an apparatus body that has been opened completely to a certain predetermined angle, and aims to offer an opening and closing device which is structured simple yet it effectively avoids the damage, and implements reliable opening and closing operation.

Opening and closing device in the present invention includes a fixed member, a movable member, a spring and a case. The fixed member is provided at a side with a fixed cam. The movable member is disposed so that it can rotate with respect to the fixed member, and provided at the side opposing to the fixed cam with a movable cam. The spring is for bringing the movable cam and the fixed cam into a state of elastic contact. The case, which has a substantially round cylindrical shape, houses the above-described items. There is a guiding mechanism formed between the case and the movable member for supporting the movable member so as it can move along the axis direction, the guiding mechanism being provided in the end part facing to the fixed member with a section that has a broader width.

The broader width section is for allowing the case to rotate a step further when a full-open body is hit by an additional force. This configuration is simple, but it effectively works to protect the fixed cam, the movable cam and other constituent components from being damaged, and ensures reliable operation of opening and closing.

BEST MODE FOR CARRYING OUT THE INVENTION

An exemplary embodiment of the present invention is described in the following with reference to the drawings. Among the drawings, the cross sectional views are shown magnified in the radius direction for illustrating the mutual relationship between fixed cam and movable cam clearer. Those portions whose structures are identical to those described in the earlier column, Background Art, are represented by using the same symbols, and descriptions on which portions have been simplified.

Figure 1:
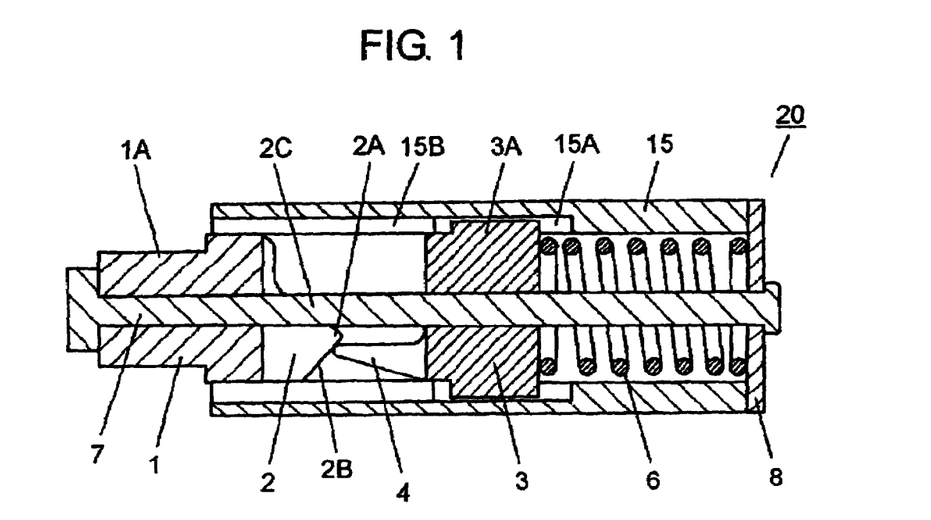
FIG. 1 is a cross sectional view of an opening and closing device in accordance with an exemplary embodiment of the present invention.
Figure 2A:
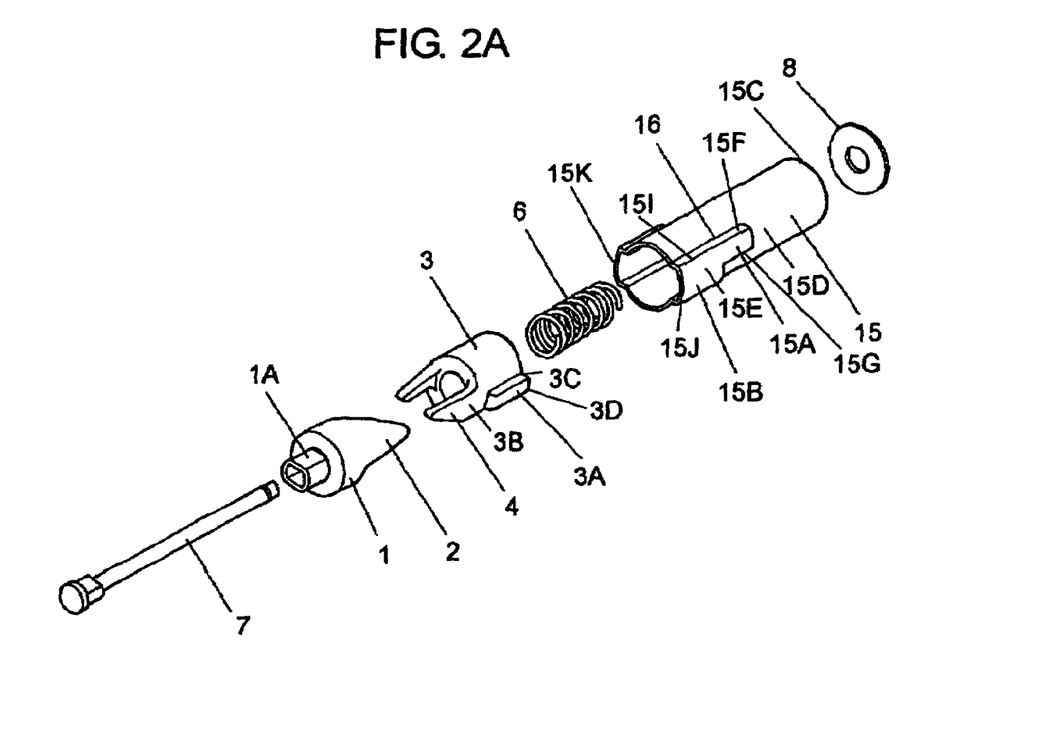
FIG. 2A is an exploded perspective view of the opening and closing device.

FIG. 1 is a cross sectional view of an opening and closing device in accordance with an exemplary embodiment of the present invention. FIG. 2A is an exploded perspective view of the opening and closing device. Relative positioning among the components in the present embodiment is described based on the relevant drawing as viewed from the front. Referring to FIG. 1 and FIG. 2A, opening and closing device 20 includes fixed member 1, fixed cam 2, movable member 3, movable cam 4, spring 6, fixed shaft 7, end ring 8 and case 15. Fixed member 1 has a substantially round cylindrical shape with fixing portion 1A provided at the left. There is no specific limitation in the kind of materials used; fixed member 1 may be made with a metal material such as steel, copper alloy, sintered metal alloy, or a resin material. Fixed cam 2 is provided at the right of fixed member 1 along the outer circumference; the cam is formed of protruding portion 2A protruding along the outer circumference and two slopes 2B and 2C stretching to the right and the left from protruding portion 2A.

Movable member 3 has a substantially round cylindrical shape; there is no specific limitation in the kind of materials used, it may be made with either a metal material or a resin material. Movable cam 4 can rotate in the open-close direction with respect to fixed member 1; it is provided at the left, which is the side opposing to fixed cam 2, along the outer circumference for plural numbers in the symmetrical arrangement.

Case 15 has a substantially round cylindrical shape; there is no specific limitation in the materials used, it may be made with either a metal material or a resin material. Case 15 is provided with guide groove 15A protruding outward for plural numbers and disposed in the symmetrical arrangement. Guide groove 15A allows insertion of guide protrusion 3A which is protruding from the outer circumferential surface of movable member 3 for plural numbers, the width of each being slightly smaller than that of guide groove 15A. Case 15's guide groove 15A is provided at the fixed member 1 side with broader width section 15B, the width of which section is expanded to be broader than guide groove 15A towards the direction of closure. Thus, a guiding mechanism is formed for supporting movable member 3 so as it can move along the direction of axis within case 15.

Spring 6 which has a coiled form is mounted between the right side of movable member 3 and the right end bottom of case 15 in a slightly compressed state. Spring 6 pushes movable member 3 to the left, so the tip end of movable cam 4 makes an elastic contact with fixed cam 2 at slope 2B. Fixed shaft 7 has a substantially round column shape. The left end of fixed shaft 7 is connected tight with fixed member 1, while the right end proceeds through movable member 3's central void and spring 6 to be supported by end ring 8 so that it can rotate with respect to the right end side of case 15. Fixed member 1's fixing portion 1A is pushing out of the left side of case 15 so that it can rotate. Case 15 houses fixed member 1, movable member 3, spring 6 and other items.

The above-configured opening and closing device 20 is mounted in the body of a portable telephone unit in the same manner as in conventional opening and closing device 10; it is connected tight with fixed cabinet 22 and with movable cabinet 23, as illustrated in FIG. 4B. Describing more practically; fixed member 1's fixing portion 1A is connected tight with fixed cabinet 22, which cabinet containing operating portion 22A consisting of a plurality of keys disposed on the upper surface and sound input portion 22B consisting of a microphone, etc., while the outer circumferential surface of case 15 together with guide groove 15A and broader width section 15B is connected tight with movable cabinet 23, which cabinet containing display portion 23A such as an LCD disposed on the surface area and sound output portion 23B consisting of a speaker, etc. Thus, a portable telephone unit, or an electronic apparatus, is made up of fixed cabinet 22 and movable cabinet 23 which are pivotally coupled together by means of opening and closing device 20 so that they can be opened and folded to each other.

Figure 3A:
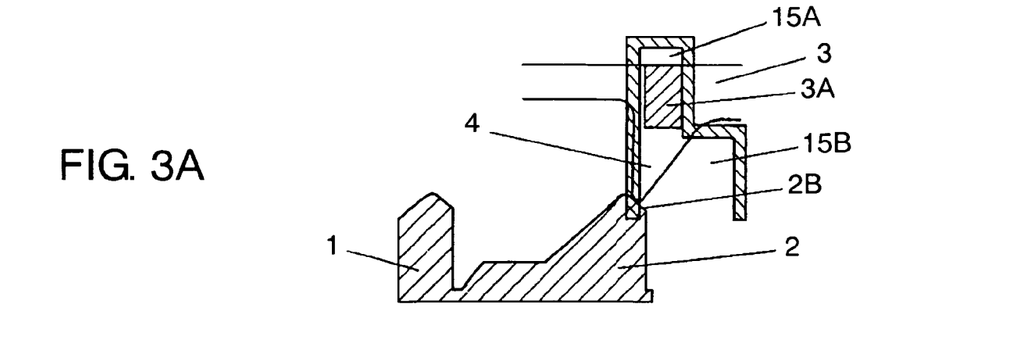
FIG. 3A through 3D are cross sectional views in part of the opening and closing device.

FIG. 3A through 3D are cross sectional views in part of an opening and closing device in accordance with an exemplary embodiment of the present invention. The operation of the opening and closing device 20 is described referring to FIG. 1, FIG. 2A and FIG. 3A through 3D. In a state where the tip end of movable cam 4 is making an elastic contact to slope 2B which is at the lower part of fixed cam 2, movable member 3 is pressed downward, or the direction of closure, by the force of spring 6. Under this state, since the right end of guide protrusion 3A is making an elastic contact to the right end of guide groove 15A as illustrated in FIG. 3A, movable cabinet 23 which has been connected tight with case 15 is held at closed state with respect to fixed cabinet 22 as illustrated in FIG. 4A.

Figure 3B:
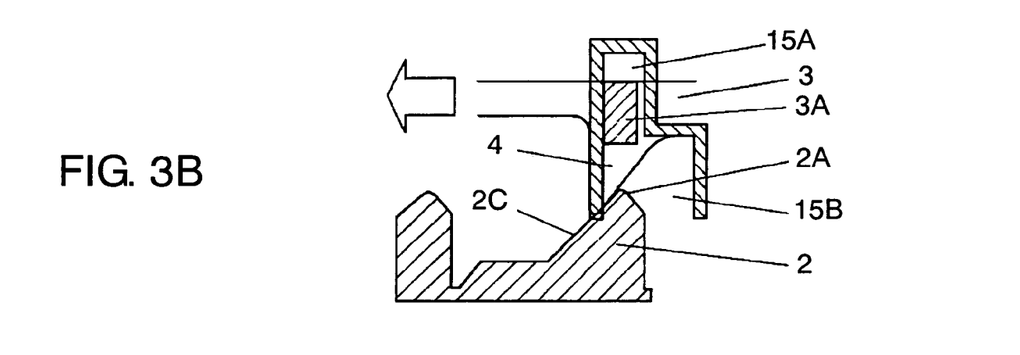

Starting from this closed state, when movable cabinet 23 is opened by the hand as shown in FIG. 4B, the motion is conveyed via case 15, which is connected tight with movable cabinet 23, causing movable member 3 to shift its location along the direction of axis within case 15 and makes rotating motion. The tip end of movable cam 4 travels beyond fixed cam 2's protruding portion 2A to make an elastic contact with left slope 2C as illustrated in FIG. 3B. Then, movable member 3 is pushed towards the left, or to the direction of open, and the left end of lowered guide protrusion 3A makes an elastic contact to guide groove 15A at the left. As the result, movable cabinet 23 is driven with a force towards open.

Figure 3C:
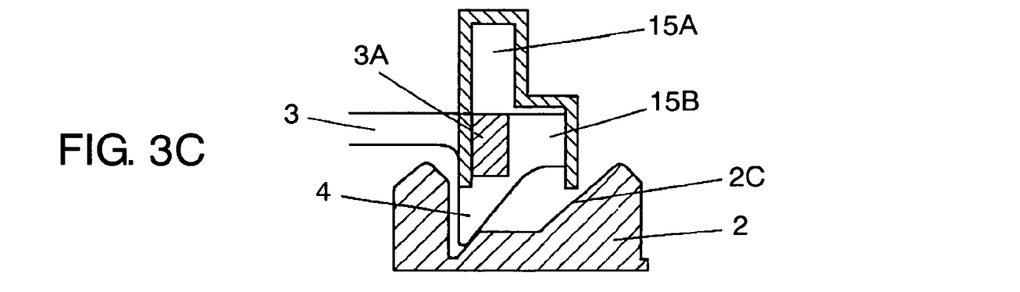

As shown in FIG. 3C, the tip end of movable cam 4 further slides along slope 2C keeping an elastic contact with it. The left end of guide protrusion 3A, which protrusion has moved further down and towards fixed member 1, pushes guide groove 15A at the left and case 15 rotates towards the direction for open. When the tip end of movable cam 4 arrives at a certain specified position, movable cabinet 23 which has been connected tight with case 15 is brought to a certain predetermined open angle of about 150–170 degrees with respect to fixed cabinet 22, as shown in FIG. 4C.

Figure 3D:
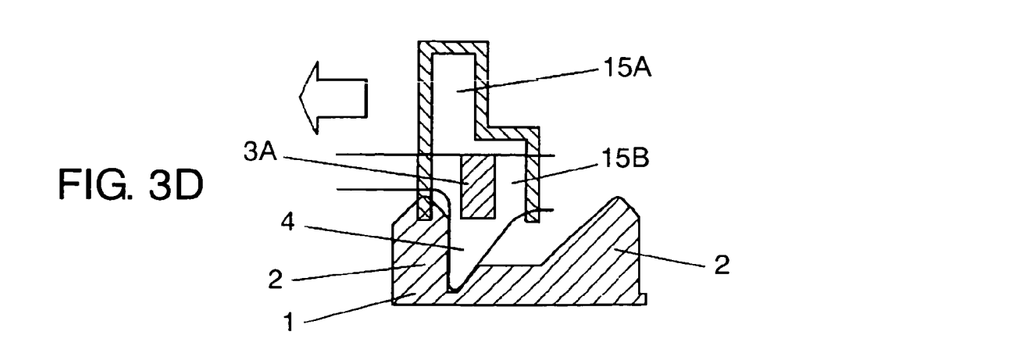

Now in the following, description is made on a possible situation where movable cabinet 23, which has already been fully opened to the predetermined angle, is incidentally hit by an external power forcing the cabinet to open further beyond the angle; for example, when it is pushed from the behind as shown in FIG. 4D. As FIG. 3D shows, case 15's guide groove 15A is provided at fixed member 1 side with broader width section 15B which is extending towards the direction of closure. Upon receiving the above-described incidental power, the left end of guide protrusion 3A gets off the left end of guide groove 15A taking advantage of the extra width of the guide groove, case 15 makes further revolution towards open for an amount identical to the width of broader width section 15B.

As described in the above, when movable cabinet 23 is forced to open further after it was opened to a certain specified angle, broader width section 15B allows case 15 to rotate further until movable cabinet 23 and fixed cabinet 22 are almost flattened. In this way, opening and closing device 20 prevents the subsequent fixed cam 2 and movable cam 4, disposed in symmetrical arrangement, from being damaged. Thus, opening and closing device 20 can continue the open-close work without any trouble even after it is hit by an accidental force.

In the present embodiment, a guiding mechanism is formed between case 15 and movable member 3 which supports movable member 3 so that it can move along the axis direction. The guiding mechanism is provided with broader width section 15B at the fixed member 1 side of guide groove 15A. This enables case 15 to make an additional rotating motion when an already-opened cabinet is hit by an additional force. This simple structure prevents fixed cam 2, movable cam 4 and other constituent components from being damaged, and ensures reliable operation of opening and closing.

Figure 2B:
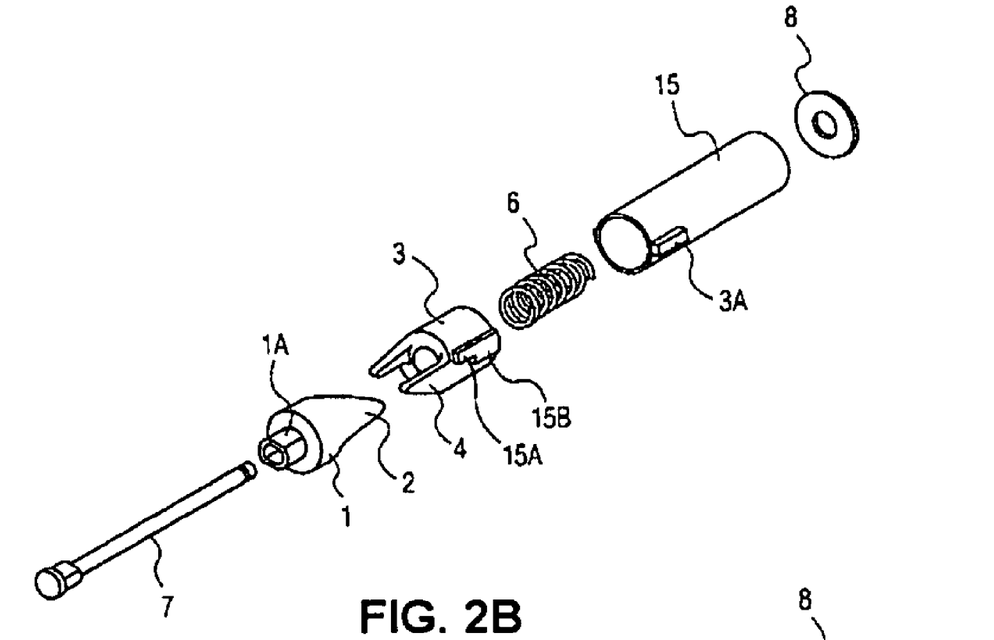
FIG. 2B and FIG. 2C are exploded perspective views of alternative examples.
Figure 2C:
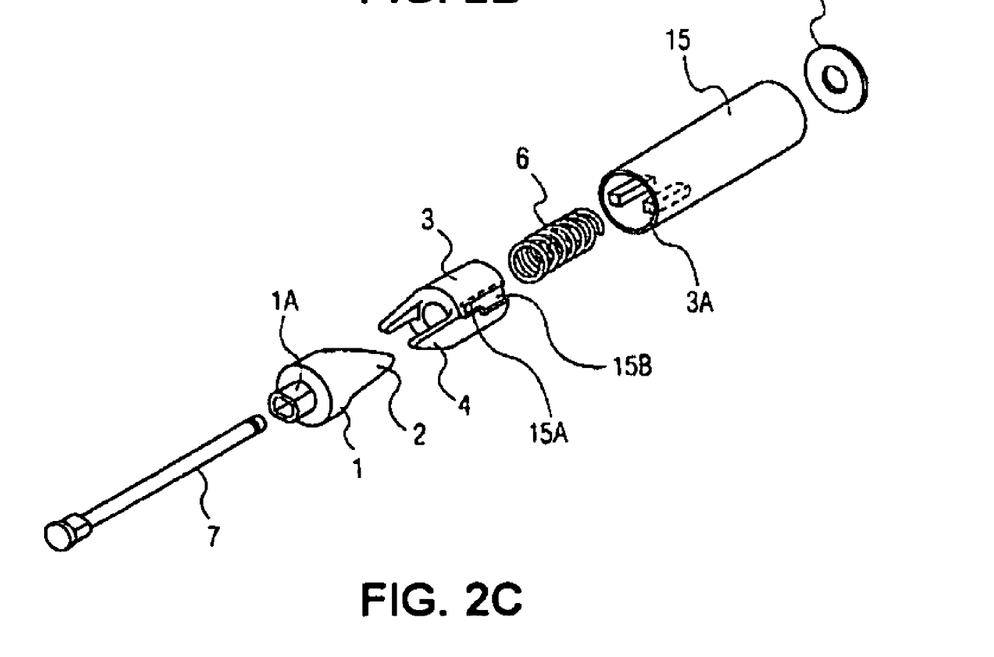

The guiding mechanism in the above descriptions has been formed of an integration of case 15's guide groove 15A and broader width section 15B with guide protrusion 3A which is provided at the outer circumference of movable member 3. However, it is not the intention of present invention to limit structure of the guiding mechanism to the above-described; as an alternative example seen in FIG. 2B and FIG. 2C, case 15's guide groove and broader width section may be provided instead in the form of an opening, or in an opposite idea, a protrusion on case 15 side while a hollow in movable member 3 side.

An opening and closing device in the present invention has a simple structure, yet it effectively prevents the fixed cam, movable cam and/or other constituent components from being damaged to perform the operation of unfolding and closing in a reliable manner. Opening and closing devices in accordance with the present invention can be introduced in various types of electronic apparatus for an additional advantage.

The invention claimed is:

1. An opening and closing device comprising
  a fixed member provided with a fixed cam on a side of said fixed member,
  a movable member provided with a movable cam, said movable member disposed at said side of said fixed member so that said movable member can rotate with respect to said fixed member,
  a spring for urging said movable cam towards said fixed cam, and
  a case of substantially round cylindrical shape for housing said movable member;
  said case having a channel for supporting said movable member during sliding motion along a length of said channel,
  said channel having a plurality of widths
  said spring urges said movable cam away from a first end of said case; and
  said plurality of widths of said channel comprises a narrower width corresponding to a narrower width portion and a broader width corresponding to a broader width portion, said narrower width portion being disposed between said broader width portion and said first end.

2. The opening and closing device according to claim 1, wherein said movable member is further provided with guide protrusions for engaging said channel during said sliding motion along said length of said channel.

3. The opening and closing device according to claim 2, wherein said guide protrusions has a width substantially similar to said narrower width, said width of said guide protrusions corresponding to a guide protrusion width.

4. The opening and closing device according to claim 3, wherein:
said broader width is a distance between:
a first surface of said broader width portion corresponding to a first broader width portion surface, and
a second surface of said broader width portion corresponding to a second broader width portion surface, said first and second broader width portion surfaces being substantially parallel;
said first guide protrusion surface is in contact with said first broader width portion surface during a stage of operation of said opening and closing device; and
said second guide protrusion surface is in contact with said second broader width portion surface during another stage of operation of said opening and closing device.

5. The opening and closing device according to claim 2, wherein:
said guide protrusion width is a distance between:
a first surface of said guide protrusion corresponding to a first guide protrusion surface, and
a second surface of said guide protrusion corresponding to a second guide protrusion surface, said first and second guide protrusion surfaces being substantially parallel;
said narrower width is a distance between:
a first surface of said narrower width portion corresponding to a first narrower width portion surface, and
a second surface of said narrower width portion corresponding to a second narrower width portion surface, said first and second narrower width portion surfaces being substantially parallel;
said first guide protrusion surface is in contact with said first narrower width portion surface during a stage of operation of said opening and closing device; and
said second guide protrusion surface is in contact with said second narrower width portion surface during another stage of operation of said opening and closing device.

6. The opening and closing device according to claim 5, wherein said first broader width portion surface is coplanar with said first narrower width portion surface.

7. The opening and closing device according to claim 5, wherein said second broader width portion surface is coplanar with said second narrower width portion surface.

8. The opening and closing device according to claim 2, wherein said guide protrusions is provided on an outer surface of said movable member.

9. The opening and closing device according to claim 8, wherein said plurality of cam surfaces includes a first cam surface configured to urge rotational movement in a first rotational direction between said fixed member and said movable member.

10. The opening and closing device according to claim 9, wherein said plurality of cam surfaces further includes a notched cam surface configured to oppose rotational movement in said first rotational direction and said second rotational direction.

11. The opening and closing device according to claim 1, wherein:
said fixed cam comprises a plurality cam surfaces; and
said spring urges said movable cam along said plurality of cam surfaces as said movable member rotates with respect to said fixed member.

12. The opening and closing device according to claim 11, wherein said plurality of cam surfaces further includes a second cam surface configured to urge rotational movement in a second rotational direction between said fixed member and said movable member, said second rotational direction being opposite said first rotational direction.

13. The opening and closing device according to claim 12, wherein guide protrusions is:
disposed within said narrower width portion of said channel when said movable cam is in contact with said first cam surface; and
disposed within said broader width portion of said channel when said movable cam is in contact with said notched cam surface.

14. The opening and closing device according to claim 1 further comprising a shaft, wherein:
said fixed member is securely affixed to said shaft; and
said movable member and said case are rotatably mounted to said shaft.

15. The opening and closing device according to claim 1, wherein said broader width portion is disposed at a second end of said case opposite said first end of said case.

16. An opening and closing device comprising
a fixed member provided with a fixed cam on a side of said fixed member,
a movable member provided with a movable cam, said movable member disposed at said side of said fixed member so that said movable member can rotate with respect to said fixed member,
a spring for urging said movable cam towards said fixed cam, and
a case of substantially round cylindrical shape for housing said movable member;
said movable member having a channel for supporting said case during sliding motion along a length of said case,
said channel having a plurality of widths,
said spring urges said movable cam away from a first end of said case; and
said plurality of widths of said channel comprises a narrower width corresponding to a narrower width portion and a broader width corresponding to a broader width portion, said broader width portion being disposed between said narrower width portion and said first end.

* * * * *